United States Patent
McCracken et al.

(10) Patent No.: US 9,423,826 B2
(45) Date of Patent: Aug. 23, 2016

(54) MECHANICAL ATTACH AND RETENTION FEATURE

(71) Applicant: Microsoft Technology Licensing, LLC, Redmond, WA (US)

(72) Inventors: Ivan Andrew McCracken, Sammamish, WA (US); Hua Wang, Sammamish, WA (US); Karsten Aagaard, Monroe, WA (US); David Otto Whitt, III, Sammamish, WA (US); Andrew E. Winter, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 120 days.

(21) Appl. No.: 14/229,196

(22) Filed: Mar. 28, 2014

(65) Prior Publication Data
US 2015/0277508 A1  Oct. 1, 2015

(51) Int. Cl.
| | |
|---|---|
| G06F 1/18 | (2006.01) |
| G06F 1/16 | (2006.01) |
| H04M 1/18 | (2006.01) |
| A45C 11/00 | (2006.01) |

(52) U.S. Cl.
CPC ........... *G06F 1/1626* (2013.01); *G06F 1/1618* (2013.01); *G06F 1/1654* (2013.01); *G06F 1/1669* (2013.01); *H04M 1/185* (2013.01); *A45C 2011/002* (2013.01); *A45C 2011/003* (2013.01); *G06F 2200/1634* (2013.01)

(58) Field of Classification Search
None
See application file for complete search history.

(56) References Cited

U.S. PATENT DOCUMENTS

| | | | |
|---|---|---|---|
| 6,247,595 B1 | 6/2001 | Omata et al. | |
| 6,976,799 B2 * | 12/2005 | Kim | G06F 1/1618 361/679.09 |
| 7,722,358 B2 * | 5/2010 | Chatterjee | G06F 3/03543 439/38 |
| 8,143,982 B1 | 3/2012 | Lauder et al. | |
| 8,498,100 B1 | 7/2013 | Whitt, III et al. | |
| 2008/0053851 A1 | 3/2008 | Ko et al. | |

(Continued)

FOREIGN PATENT DOCUMENTS

WO   WO-2012036710   3/2012

OTHER PUBLICATIONS

"International Search Report and Written Opinion", Application No. PCT/US2015/022353, Jun. 19, 2015, 11 Pages.

(Continued)

*Primary Examiner* — Ramon M Barrera
(74) *Attorney, Agent, or Firm* — Qudus Olaniran; Judy Yee; Micky Minhas (57) ABSTRACT

A mechanical attach and retention feature is described. An apparatus may include a cover portion that is configured to cover at least a portion of a display device of a computing device having a mobile form factor that is configured to be held by one or more hands of a user. The apparatus includes, a first mid-spine that is rotationally connected to the cover portion, a second mid-spine that is rotationally connected to the first mid-spine, and a connection portion that is rotationally connection to the second mid-spine. The connection portion is configured to form a removable physical coupling to the computing device using a projection that is configured to be disposed within a channel formed in a housing of the computing device and a protrusion disposed on the projection, the protrusion configured to be received within a cavity formed as part of the channel.

20 Claims, 9 Drawing Sheets

(56) References Cited

U.S. PATENT DOCUMENTS

2010/0078343 A1    4/2010   Hoellwarth et al.
2011/0297564 A1   12/2011   Kim et al.
2013/0056374 A1    3/2013   Chung
2013/0277271 A1   10/2013   Toulotte
2013/0313142 A1   11/2013   Wen

OTHER PUBLICATIONS

Kowalczyk, "50 Stylish Tablet Covers, Cases and Sleeves", Retrieved From: <http://ebookfriendly.com/stylish-tablet-covers-cases-and-sleeves/> Mar. 13, 2014, Jul. 20, 2013, 52 Pages.

"International Preliminary Report on Patentability", Application No. PCT/US2015/022353, Mar. 15, 2016, 7 pages.

* cited by examiner

MECHANICAL ATTACH AND RETENTION FEATURE

BACKGROUND

Mobile computing devices have been developed to increase the functionality that is made available to users in a mobile setting. For example, a user may interact with a mobile phone, tablet computer, or other mobile computing device to check email, surf the web, compose texts, interact with applications, and so on.

Because mobile computing devices are configured to be mobile, however, the devices may be exposed to a variety of different environments and usage scenarios that could potentially damage the device. Accordingly, devices (e.g., covers) have been developed to protect the computing device. Conventional techniques to install and remove these devices from the computing device, however, alternated between being difficult to remove but providing good protection or being relatively easy to remove but providing limited protection.

SUMMARY

A mechanical attach and retention feature is described. In one or more implementations, an apparatus includes a cover portion that is configured to cover at least a portion of a display device of a computing device having a mobile form factor such that the computing device is configured to be held by one or more hands of a user. The apparatus includes a first mid-spine that is rotationally connected to the cover portion, a second mid-spine that is rotationally connected to the first mid-spine, and a connection portion that is rotationally connection to the second mid-spine. The connection portion is configured to form a removable physical coupling to the computing device using a projection that is configured to be disposed within a channel formed in a housing of the computing device and a protrusion disposed on the projection, the protrusion configured to be received within a cavity formed as part of the channel.

In one or more implementations, an apparatus includes a cover portion configured to cover at least a portion of a display device of a computing device having a mobile form factor such that the computing device is configured to be held by one or more hands of a user. The apparatus also includes a connection portion that is rotationally connection to the cover portion via a rotatable hinge. The connection portion is configured to form a removable physical coupling to the computing device using a projection that is configured to be disposed within a channel formed in a housing of the computing device and a protrusion disposed on the projection, the protrusion configured to be received within a cavity formed as part of the channel, the protrusion is configured to be removed from the cavity along an axis defined by a height of the protrusion from the projection and to resist movement along at least one different axis. The protrusion has sides along the axis having a first portion disposed on the side between the protrusion and the input portion and a second portion that follows a longitudinal axis of the connection portion, the second portion having an angle in relation to the axis that is greater than an angle of the second portion in relation to the axis.

In one or more implementations, a computing system includes a computing device and an apparatus that are configured to be physically coupled using a projection that is configured to be disposed within a channel and a protrusion disposed on the projection. The protrusion is configured to be received within a cavity formed as part of the channel and configured to be removed from the cavity along an axis defined by a height of the protrusion from the projection and to resist movement along at least one different axis. The protrusion has sides along the axis having a first portion disposed on the side between the protrusion and the input portion and a second portion that follows a longitudinal axis of the connection portion, the second portion having an angle in relation to the axis that is greater than an angle of the second portion in relation to the axis.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

A variety of different devices may be physically attached to a mobile computing device to provide a variety of functionality. For example, a device may be configured to provide a cover for at least a display device of the computing device to protect it against harm. Other devices may also be physically attached to the mobile computing device, such as an input device (e.g., keyboard having a track pad) to provide inputs to the computing device. However, conventional techniques that were utilized to support a physical attachment alternated between providing good protection or ease of removal, but not both.

Mechanical attach and detach techniques are described. In one or more implementations, a cover (or other device such as an input device) is configured to protect at least a portion of a mobile computing device, such as a display device. The cover is attachable via a removable physical computing (e.g., via a magnetic interface) which may be made more robust to user interaction (e.g., open, close, drop) by the addition of mechanical features. The mechanical features (e.g., protrusions) may be used to prevent the cover from detaching from the computing device except when the user specifically intends to detach the cover. Thus, the mechanical features may be used to protect against unintended detach in a variety of different scenarios, such as when wrapping the cover around the back of the device, wrapping the cover around a stylus that is located on the back of the device, wrapping the cover around a stylus that is attached to the cover, picking the device up by the cover, grasping the cover as the device slips out of the user's hand, the device falls and impacts an immoveable object, and so on.

Additionally, the mechanical features may be configured to support ease of attach and removal by one or more hands of a user. The mechanical features, for instance, may be configured to have a size and shape such that the cover may be removed in a manner that mimics tearing a page from a book but restricts removal along other axes. The shape and height of a protrusion of the mechanical features, for example, may support a desired balance between ease of attach and retention of the cover, further discussion of which may be found in relation to the following sections.

In the following discussion, an example environment is first described that may employ the techniques described herein. Although a passive device is described, other devices are also contemplated that include input functionality, such as a cover/keyboard combination. For example, these techniques are equally applicable to active devices, e.g., a cover having and input portion (e.g., keys of a keyboard), track pads, capacitive touch devices, membrane switches, and so on as further described below.

Example Environment

Figure 1:
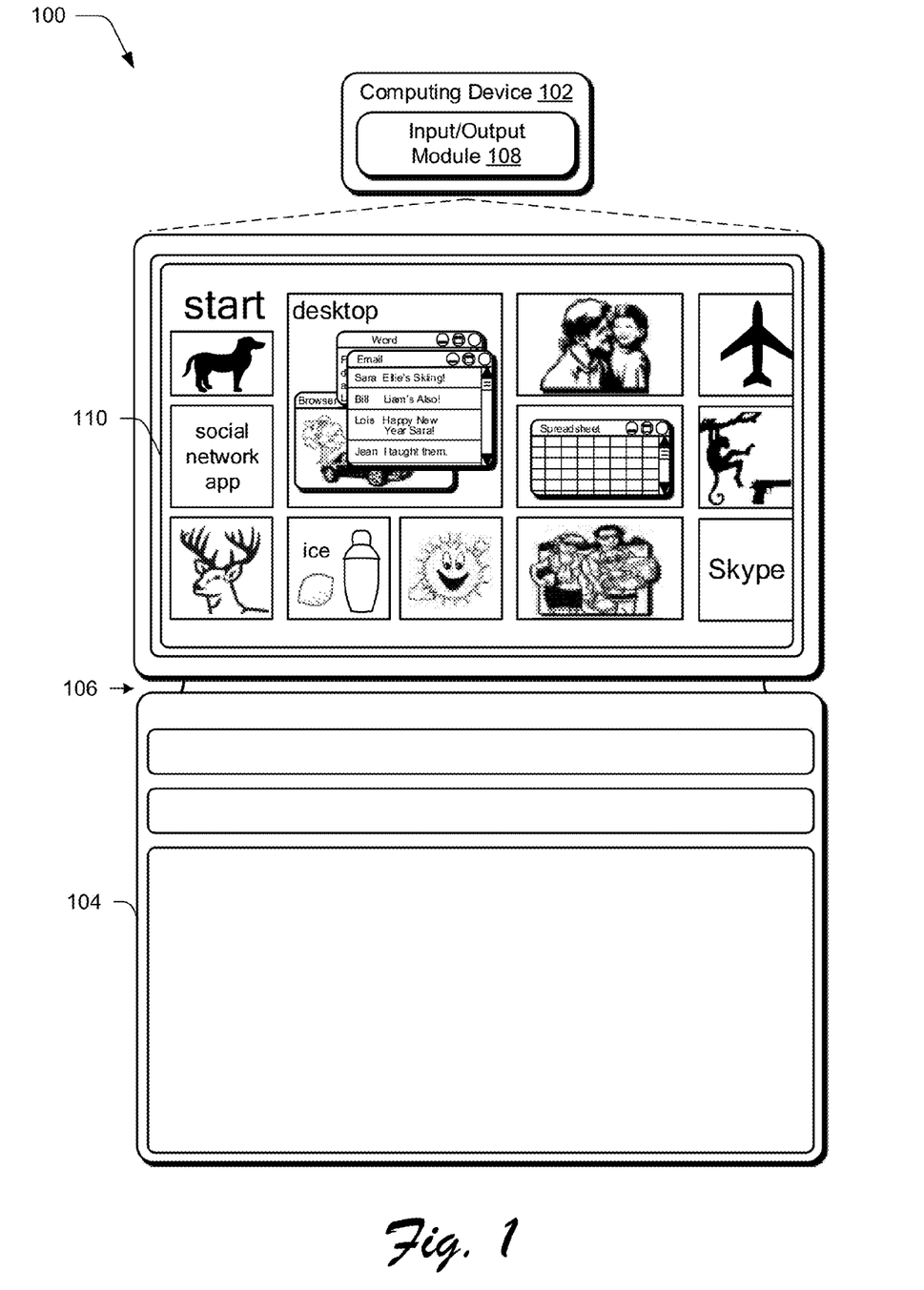
FIG. 1 is an illustration of an environment in an example implementation that is operable to employ the mechanical attach and detach techniques described herein.

FIG. 1 is an illustration of an environment 100 in an example implementation that is operable to employ the mechanical attach and detach techniques described herein. The illustrated environment 100 includes an example of a computing device 102 that is physically and communicatively coupled to a protection device 104 via a rotatable hinge 106. The protection device 104 may be configured in a variety of ways, such as a cover as illustrated, an input device (e.g., a keyboard), an output device, and so on.

The computing device 102 may also be configured in a variety of ways. For example, the computing device 102 may be configured for mobile use, such as a mobile phone, a tablet computer as illustrated, and so on. Thus, the computing device 102 may range from full resource devices with substantial memory and processor resources to a low-resource device with limited memory and/or processing resources. The computing device 102 may also relate to software that causes the computing device 102 to perform one or more operations.

The computing device 102, for instance, is illustrated as including an input/output module 108. The input/output module 108 is representative of functionality relating to processing of inputs and rendering outputs of the computing device 102. A variety of different inputs may be processed by the input/output module 108, such as inputs relating to functions that correspond to keys of the protection device 104 (e.g., when including input functionality), keys of a virtual keyboard displayed by the display device 110 to identify gestures and cause operations to be performed that correspond to the gestures that may be recognized through the protection device 104 and/or touchscreen functionality of the display device 110, and so forth. Thus, the input/output module 108 may support a variety of different input techniques by recognizing and leveraging a division between types of inputs including key presses, gestures, and so on.

As previously described, the protection device 104 is physically and communicatively coupled to the computing device 102 in this example through use of a rotatable hinge 106. The rotatable hinge 106 may be configured in a variety of ways to support rotation, such as a mechanical hinge, friction hinge, flexible hinge, and so on. For example a flexible hinge is flexible in that rotational movement supported by the hinge is achieved through flexing (e.g., bending) of the material forming the hinge as opposed to mechanical rotation as supported by a pin, although that embodiment is also contemplated. Further, this flexible rotation may be configured to support movement in one or more directions (e.g., vertically in the figure) yet restrict movement in other directions, such as lateral movement of the protection device 104 in relation to the computing device 102. This may be used to support consistent alignment of the protection device 104 in relation to the computing device 102, such as to align sensors used to change power states, application states, and so on.

The rotatable hinge 106, for instance, may be formed using one or more layers of fabric and include conductors formed as flexible traces to communicatively couple the protection device 104 to the computing device 102 and vice versa, e.g., when including keys of a keyboard as previously described. This communication, for instance, may be used to communicate a result of a key press to the computing device 102, receive power from the computing device, perform authentication, provide supplemental power to the computing device 102, and so on. The rotatable hinge 106 may be configured in a variety of ways, further discussion of which may be found in relation to the following figure.

Figure 2:
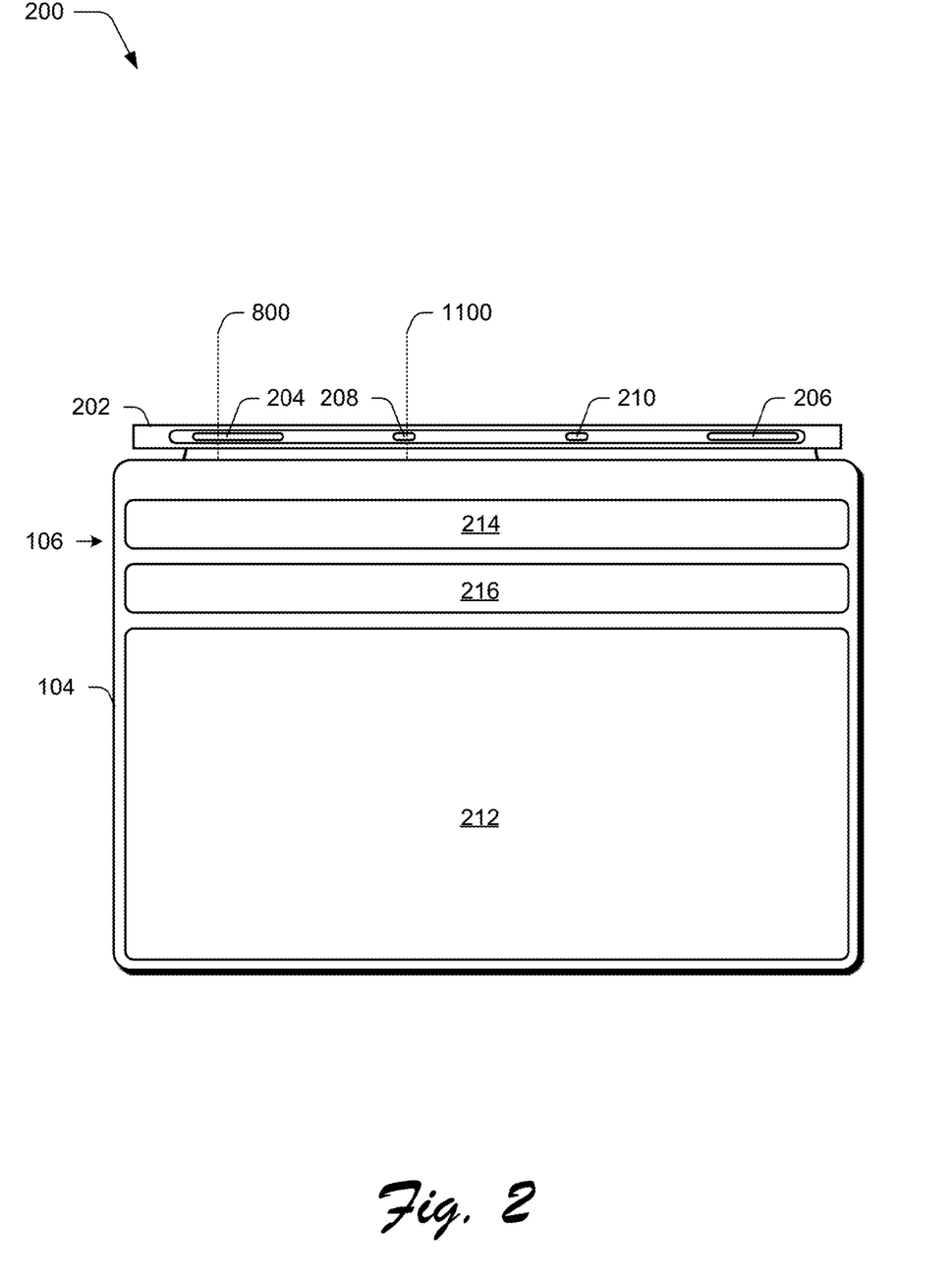
FIG. 2 depicts an example implementation of a protection device of FIG. 1 as showing a rotatable hinge in greater detail.

FIG. 2 depicts an example implementation 200 of the protection device 104 of FIG. 1 as showing the rotatable hinge 106 in greater detail. In this example, a connection portion 202 of the protection device 104 is shown that is configured to provide a removable physical connection (and even communicative connection) between the protection device 104 and the computing device 102. The connection portion 202 as illustrated has a height and cross section configured to be received in a channel in the housing of the computing device 102, although this arrangement may also be reversed without departing from the spirit and scope thereof.

The connection portion 202 is flexibly connected to a portion of the protection device 104 that forms a cover for a display device 110 of the computing device 102 of FIG. 1. Thus, when the connection portion 202 is physically connected to the computing device 102 the combination of the connection portion 202 and the rotatable hinge 106 supports movement of the protection device 104 in relation to the computing device 102 that is similar to a hinge of a book.

Through this rotational movement, a variety of different orientations of the protection device 104 in relation to the computing device 102 may be supported. For example, rotational movement may be supported by the rotatable hinge 106 such that the protection device 104 may be placed against the display device 110 of the computing device 102, positioned at a rear of the computing device 102, and so on as further described in relation to FIG. 7.

The connection portion 202 is illustrated in this example as including magnetic coupling devices 204, 206, mechanical coupling protrusions 208, 210, and a plurality of communication contacts 212. The magnetic coupling devices 204, 206 are configured to form a removable physical coupling to complementary magnetic coupling devices of the computing device 102 through use of one or more magnets. In this way, the protection device 104 may be physically secured to the computing device 102 through use of magnetic attraction such that the protection device 104 may be attached and removed manually by a user without the use of tools.

The connection portion 202 also includes a mechanical feature to support the removable physical attachment. For example, the mechanical feature may be configured to include mechanical coupling protrusions 208, 210 to form a mechanical physical connection between the protection device 104 and the computing device 102. The mechanical coupling protrusions 208, 210 are shown in greater detail in relation to FIG. 3, which is discussed below. Additionally, the protrusions 208, 210 may be configured to support communication of data and/or transfer of power.

Figure 3:
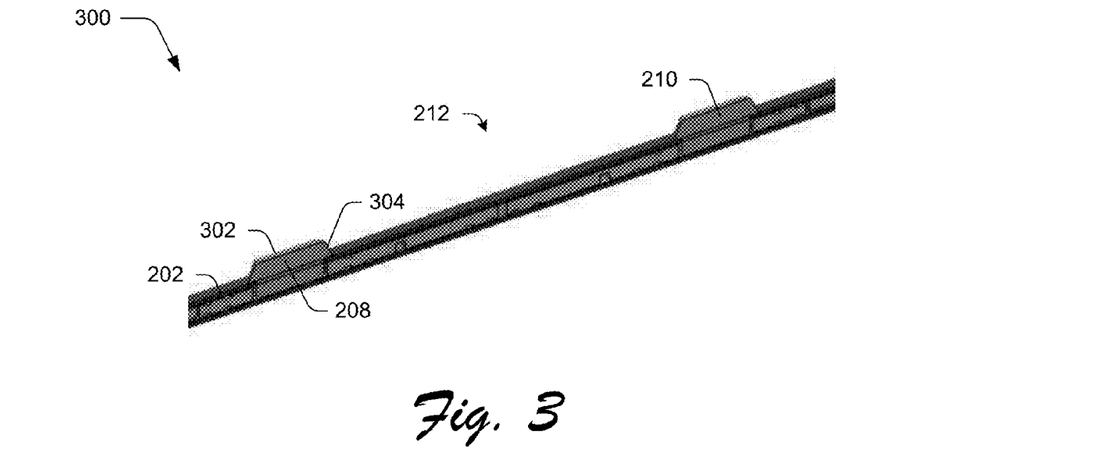
FIG. 3 depicts an example implementation showing a perspective view of a connection portion of FIG. 2 that includes the mechanical coupling protrusions.

FIG. 3 depicts an example implementation 300 showing a perspective view of the connection portion 202 of FIG. 2 that includes the mechanical coupling protrusions 208, 210. As illustrated, the mechanical coupling protrusions 208, 210 are configured to extend away from a surface of the connection portion 202, which in this case is perpendicular although other angles are also contemplated.

The mechanical coupling protrusions 208, 210 (i.e., protrusion in the following discussion) are configured to be received within complimentary cavities within the channel of the computing device 102. When so received, the mechanical coupling protrusions 208, 210 promote a mechanical binding between the devices when forces are applied that are not aligned with an axis that is defined as correspond to the height of the protrusions and the depth of the cavity, further discussion of which may be found in relation to FIG. 11.

The illustrated cut-away view of FIG. 3 follows a longitudinal axis of the connection portion 202. The protrusions 208, 210 include sides that are generally perpendicular to a top surface of the connection portion 202 and that follow, generally, an axis of insertion and removal that is to be supported by the protrusions 208, 210 within respective cavities of the computing device 102.

The sides of the protrusion 208 may be configured to have different angles to support a balance between a security and ease of attachment and removal. For example, a first portion 302 of the side of the protrusion 208 may be disposed between the connection portion 202 and the rest of the cover whereas a second side 304 may follow a longitudinal axis of the connection portion 202. These portions may have angles that are configured to support a secure attachment that may be easily removed by a user, such as to configure the first portion 202 to have less of an angle than the second portion 304 as further described below.

Figure 4:
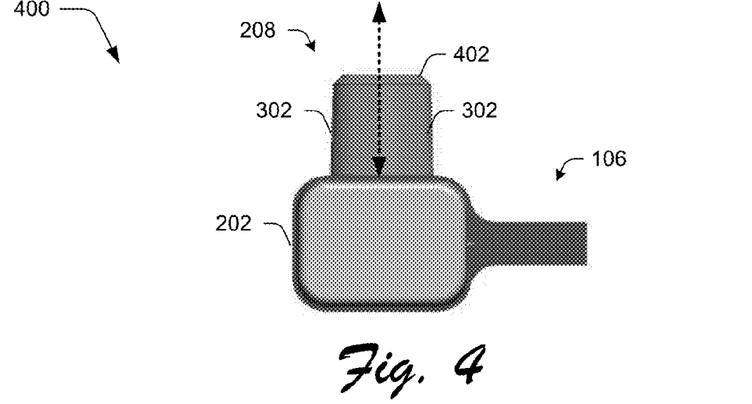
FIG. 4 depicts an example implementation showing a side view of the mechanical attach feature that is configured as a protrusion along a longitudinal axis of the connection portion.

FIG. 4 depicts an example implementation 400 showing a side view of the mechanical attach feature that is configured as a protrusion 208 along a longitudinal axis of the connection portion 202. The protrusion 208 is disposed on the connection portion 202 that is physically coupled to a rotatable hinge 106 as previously described. The protrusion 208 has a height that corresponds to an intended axis of insertion and removal of the protrusion 208, which is illustrated through use of a phantom arrow in the figure. A variety of different heights may be utilized to configure the protrusion 208, such as a height between 1.9 and 3.0 millimeters, at approximately 2.2 millimeters, and so on.

The protrusion 208 has portions 302 of the side that are defined in relation to this axis, which are opposite each other. These sides have an angle of approximately 1.5 degrees from this axis, although other angles are also contemplated. Further, a 0.3 millimeter chamfer 402 is formed on the top of the protrusion 208 to aid insertion of the protrusion within a cavity of the computing device 102. Thus, by including the chamfer 402 at an end of the protrusion 208 that is to initiate contact with the cavity, alignment of the height of the protrusion 208 with a depth of the cavity may be improved.

Figure 5:
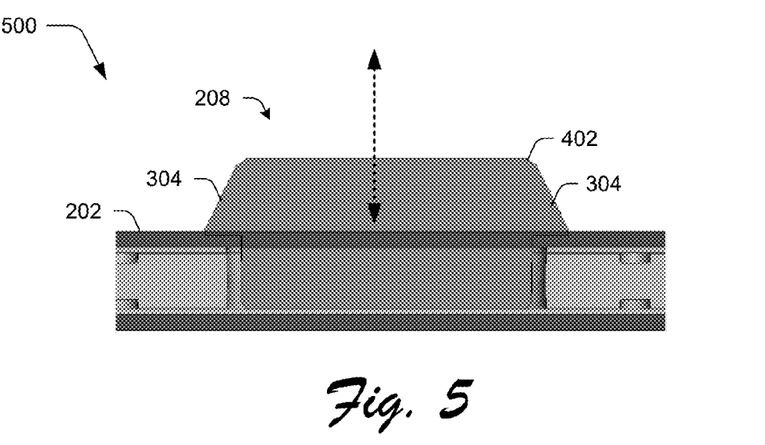
FIG. 5 depicts an example implementation showing a side view of the mechanical attach feature that is configured as a protrusion that is normal to a longitudinal axis of the connection portion.

FIG. 5 depicts an example implementation 500 showing a side view of the mechanical attach feature that is configured as a protrusion 208 that is normal to a longitudinal axis of the connection portion 202. The protrusion 208 has portions 304 of the side that are defined in relation to this axis, which are opposite each other. These sides in this instance, however, have an angle of approximately 63.5 degrees from this axis, although other angles are also contemplated. This portion 304 also includes the chamfer 402 on the top of the protrusion 208 to aid insertion of the protrusion 208.

Thus, as illustrated the portion 304 of the side of the protrusion 208 that follows a longitudinal axis of the connection portion 202 (and thus alignment along a line formed with protrusion 210) has an angle that is greater than an angle employed by a side 304 that is normal to the longitudinal axis. Thus, insertion and removal along the longitudinal axis may be eased while promoting a secure connection at angles normal to this axis that follow rotational movement of the rotatable hinge 106. In this way, the protective device 104 may be rotated without causing an unintended disconnect (e.g., mimicking movement of a cover of a book to protect the display device 110 and move the protective device 104 "out of the way") yet permit ease of insertion and removal along other axes.

Returning again to FIG. 2, the rotatable hinge 106 may also be configured to support a minimum bend radius such that the rotatable hinge 106 resists flexing below that radius. A variety of different techniques may be employed. The rotatable hinge 106, for instance, may be configured to include outer layers, which may be formed from a fabric, microfiber cloth, and so on. Flexibility of material used to form the outer layers may be configured to support flexibility as described above.

The protective device 104 includes a cover portion 212 that is configured to cover at least a portion of a display device 110 of the computing device 102. The rotatable hinge 106 also includes first and second mid-spines 214, 216 that are located between the connection portion 202 and the cover portion 212. The first and second mid-spines 214, 216 may be configured to support a variety of functionality, such as to reduce a bend radius, provide additional support to the rotational hinge 106, support storage of peripheral devices such as a stylus, and so on as further described below.

Figure 6:
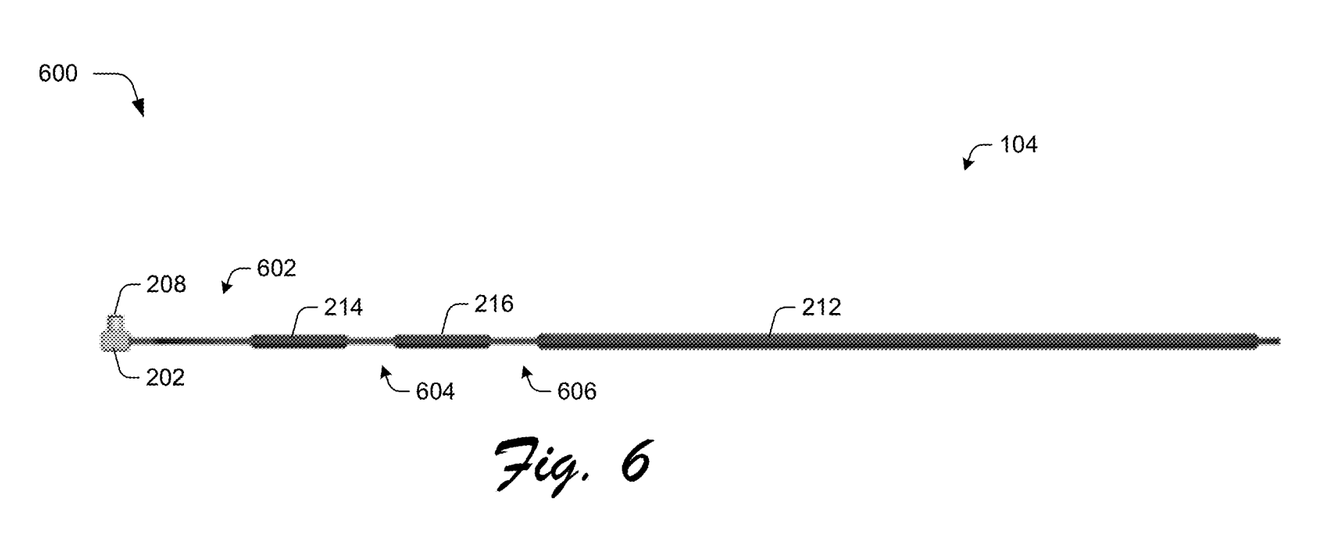
FIG. 6 is an illustration of an example implementation showing a side view of the protection device of FIG. 2.

FIG. 6 is an illustration of an example implementation 600 showing a side view of the protection device 104 of FIG. 2. The protection device 104 includes a connection portion 202 having the protrusion 208. The connection portion 202 is physically attached to the cover portion 212 using a rotatable hinge 106 as previously described.

The rotatable hinge 106 is configured as a flexible hinge having first and second mid-spines 214, 216. The first mid-spine 214 is connected to the connection portion 202 and the second mid-spine 216 using flexible hinges 602, 604, respectively. The second mid-spine 216 is also connected to the cover portion 212 using a flexible hinge 606. Through use of the flexible hinges 602-606 in combination with the first and second mid-spines 214, 216, flexibility, an operational bend radius, and stability of the rotatable hinge 106 may be configured as desired, examples of which are described as follows and shown in a corresponding figure.

Figure 7:
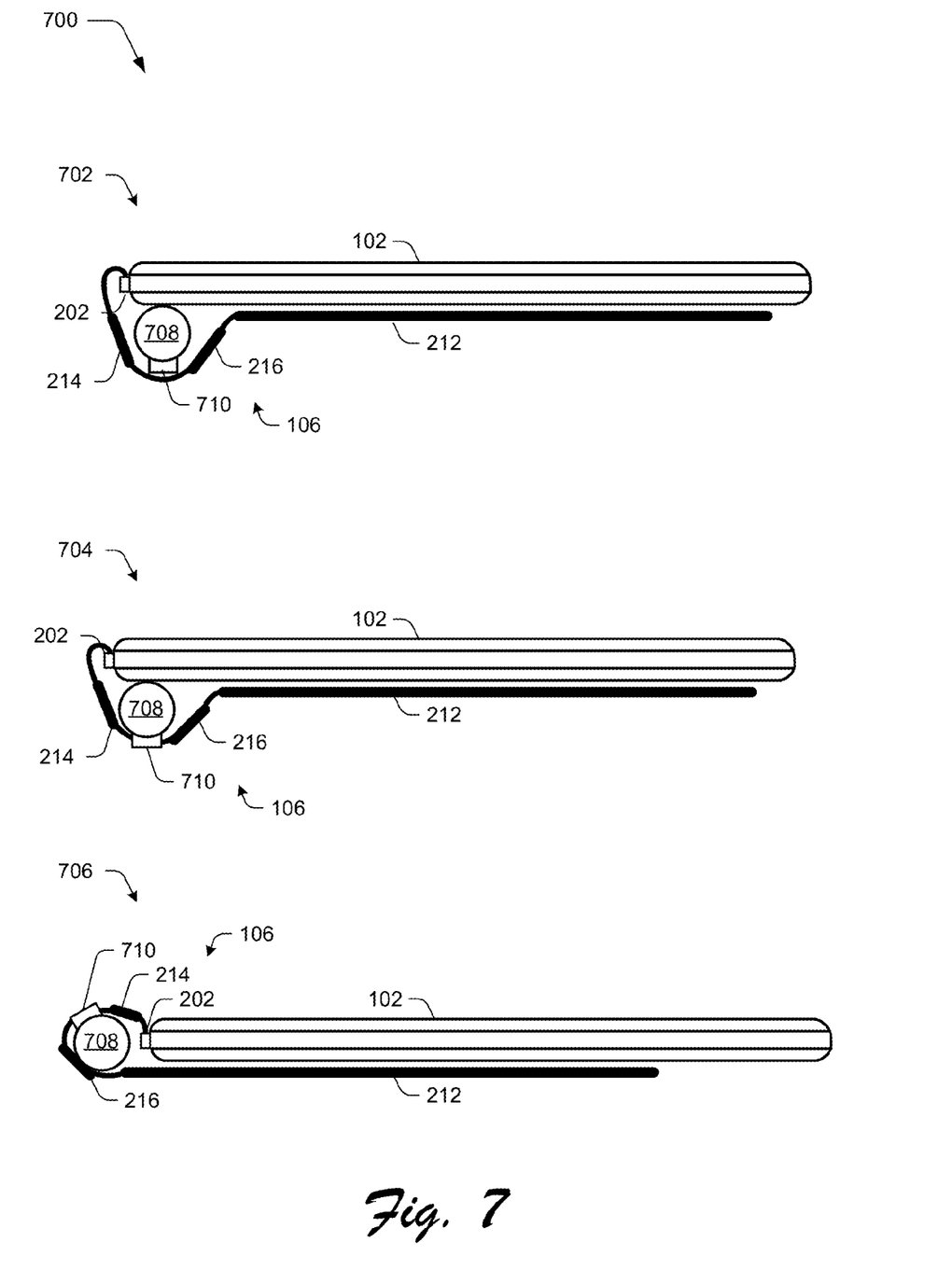
FIG. 7 depicts an example implementation in which a variety of different orientations of the protection device in relation to the computing device are shown.

FIG. 7 depicts an example implementation 700 in which a variety of different orientations of the protection device 104 in relation to the computing device 102 are shown. The illustration includes first, second, and third orientation 702, 704, 706 examples. In the first orientation 702, the cover portion 212 is disposed at a rear of a housing of the computing device 102, e.g., such that a user may view the display device 110.

The first and second mid-spines 214, 216 of the rotatable hinge 106 wrap around a peripheral device, which is illustrated as a stylus 708 in this example. The stylus 708 is disposed adjacent to a rear side of the computing device 102 that is opposite to a side having the display device 110 of FIG. 1. Thus, the rotatable hinge 106 has a length sufficient to at least partially surround the stylus 708 and permit the cover portion 212 to flatly contact the rear of the computing device 102. In this example the stylus 708, including a clip 710 of the stylus, are surrounded by the rotatable hinge.

In the second orientation 704, the cover portion 212 is disposed at a rear of a housing of the computing device 102, e.g., such that a user may view the display device 110. The first and second mid-spines 214, 216 of the rotatable hinge 106 wrap around the stylus 708 in this example but the clip 710 is illustrated as engaging (e.g., secured to) the rotatable hinge 106.

In the third orientation 706, the cover portion 212 is disposed at a rear of a housing of the computing device 102 and the stylus 708 is posited adjacent to a side of the housing. The first and second mid-spines 214, 216 of the rotatable hinge 106 wrap around the stylus 708 in this example and the clip 710 is also secured to the rotatable hinge 106. Thus, the rotatable hinge 106 has a length sufficient to at least partially surround the stylus 708 and permit the cover portion 212 to flatly contact the rear of the computing device 102 in each of the first, second, and third orientations 702, 704, 706.

Figure 8:
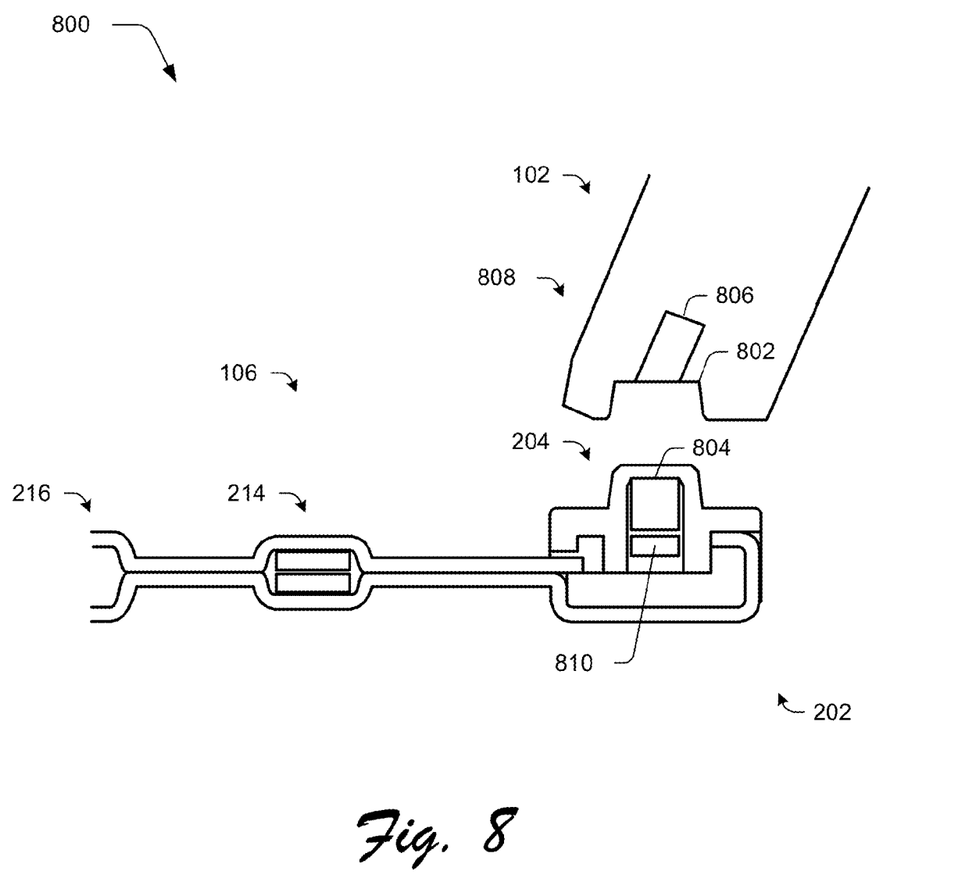
FIG. 8 depicts a cross section taken along an axis of FIG. 2 showing the magnetic coupling device as well as a cross section of a cavity of the computing device in greater detail.

FIG. 8 depicts a cross section taken along an axis 800 of FIG. 2 showing the magnetic coupling device 204 as well as a cross section of a cavity 802 of the computing device 102 in greater detail. In this example, a magnet of the magnetic coupling device 204 is illustrated as disposed within the connection portion 202.

Movement of the connection portion 202 and the channel 802 together may cause the magnet 804 to be attracted to a magnet 806 of a magnetic coupling device 808 of the computing device 102, which in this example is disposed within the channel 802 of a housing of the computing device 102. In one or more implementations, flexibility of the rotatable hinge 106 may cause the connection portion 202 to "snap into" the channel 802. Further, this may also cause the connection portion 202 to "line up" with the channel 802, such that the mechanical coupling protrusion 208 is aligned for insertion into the cavity.

The magnetic coupling devices 804, 806 may be configured in a variety of ways. For example, the magnetic coupling device 804 may employ a backing 810 (e.g., such as steel) to cause a magnetic field generated by the magnet 804 to extend outward away from the backing 810. Thus, a range of the magnetic field generated by the magnet 804 may be extended. A variety of other configurations may also be employed by the magnetic coupling device 804, 806, examples of which are described and shown in relation to the following referenced figure.

Figure 9:
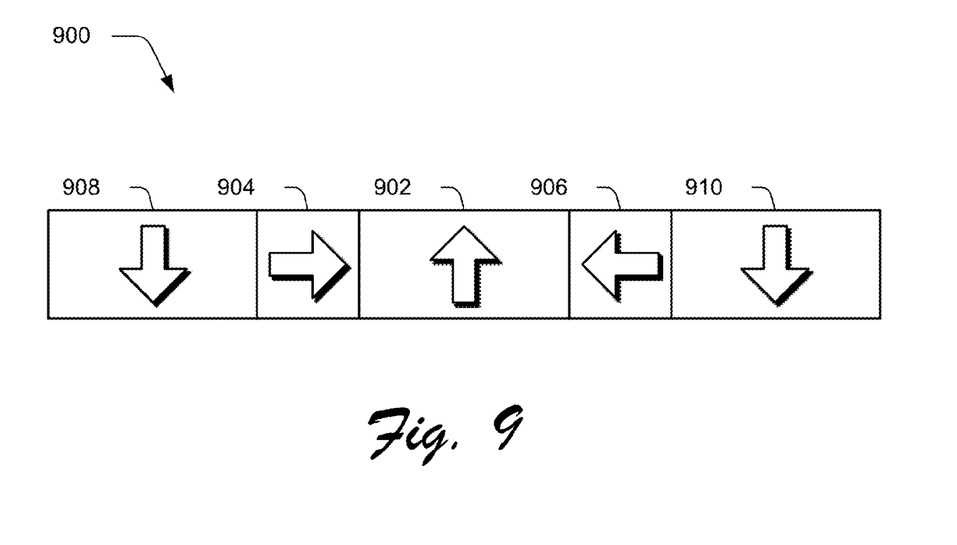
FIG. 9 depicts an example of a magnetic coupling portion that may be employed by the protection device or computing device to implement a flux fountain.

FIG. 9 depicts an example 900 of a magnetic coupling portion that may be employed by the protection device 104 or computing device 102 to implement a flux fountain. In this example, alignment of a magnet field is indicted for each of a plurality of magnets using arrows.

A first magnet 902 is disposed in the magnetic coupling device having a magnetic field aligned along an axis. Second and third magnets 904, 906 are disposed on opposing sides of the first magnet 902. The alignment of the respective magnetic fields of the second and third magnets 904, 906 is substantially perpendicular to the axis of the first magnet 902 and generally opposed each other.

In this case, the magnetic fields of the second and third magnets are aimed towards the first magnet 902. This causes the magnetic field of the first magnet 902 to extend further along the indicated axis, thereby increasing a range of the magnetic field of the first magnet 902.

The effect may be further extended using fourth and fifth magnets 908, 910. In this example, the fourth and fifth magnets 908, 910 have magnetic fields that are aligned as substantially opposite to the magnetic field of the first magnet 902. Further, the second magnet 904 is disposed between the fourth magnet 908 and the first magnet 902. The third magnet 906 is disposed between the first magnet 902 and the fifth magnet 910. Thus, the magnetic fields of the fourth and fifth magnets 908, 910 may also be caused to extend further along their respective axes which may further increase the strength of these magnets as well as other magnets in the collection. This arrangement of five magnets is suitable to form a flux fountain. Although five magnets were described, any odd number of magnets of five and greater may repeat this relationship to form flux fountains of even greater strength.

To magnetically attach to another magnetic coupling device, a similar arrangement of magnets may be disposed "on top" or "below" of the illustrated arrangement, e.g., so the magnetic fields of the first, fourth and fifth magnets 902, 908, 910 are aligned with corresponding magnets above or below those magnets. Further, in the illustrated example, the strength of the first, fourth, and fifth magnets 902, 908, 910 is stronger than the second and third magnets 904, 906, although other implementations are also contemplated. Another example of a flux fountain is described in relation to the following discussion of the figure.

Figure 10:
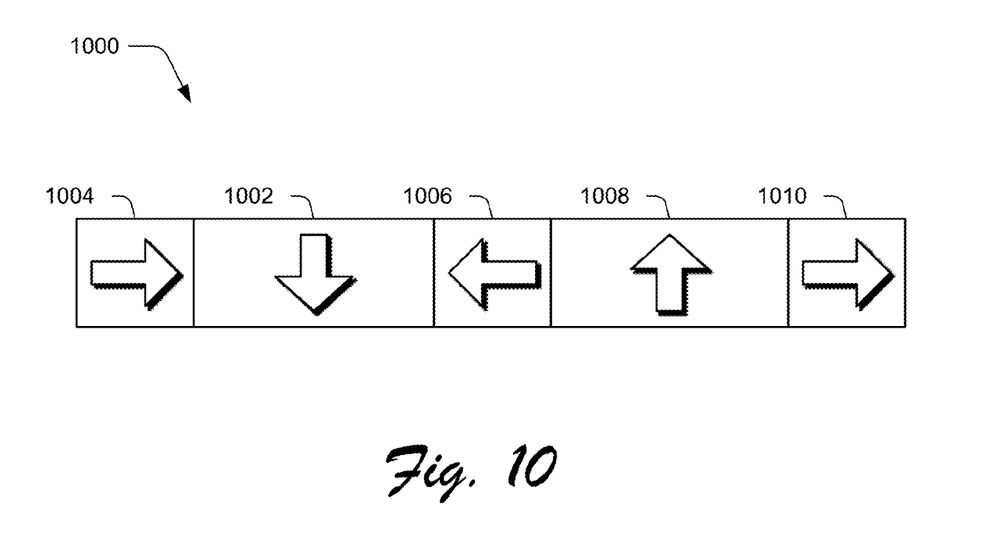
FIG. 10 depicts an example of a magnetic coupling portion that may be employed by the protection device or computing device to implement a flux fountain.

FIG. 10 depicts an example 1000 of a magnetic coupling portion that may be employed by the protection device 104 or computing device 102 to implement a flux fountain. In this example, alignment of a magnet field is also indicted for each of a plurality of magnets using arrows.

Like the example 900 of FIG. 9, a first magnet 1002 is disposed in the magnetic coupling device having a magnetic field aligned along an axis. Second and third magnets 1004, 1006 are disposed on opposing sides of the first magnet 1002. The alignment of the magnetic fields of the second and third magnets 1004, 1006 are substantially perpendicular the axis of the first magnet 1002 and generally opposed each other like the example 900 of FIG. 9.

In this case, the magnetic fields of the second and third magnets are aimed towards the first magnet 1002. This causes the magnetic field of the first magnet 1002 to extend further along the indicated axis, thereby increasing a range of the magnetic field of the first magnet 1002.

This effect may be further extended using fourth and fifth magnets 1008, 1010. In this example, the fourth magnet 1008 has a magnetic field that is aligned as substantially opposite to the magnetic field of the first magnet 1002. The fifth magnet 1010 has a magnetic field that is aligned as substantially corresponding to the magnet field of the second magnet 1004 and is substantially opposite to the magnetic field of the third magnet 1006. The fourth magnet 1008 is disposed between the third and fifth magnets 1006, 1010 in the magnetic coupling device.

This arrangement of five magnets is suitable to form a flux fountain. Although five magnets are described, any odd number of magnets of five and greater may repeat this relationship to form flux fountains of even greater strength. Thus, the magnetic fields of the first 1002 and fourth magnet 1008 may also be caused to extend further along its axis which may further increase the strength of this magnet.

To magnetically attach to another magnetic coupling device, a similar arrangement of magnets may be disposed "on top" or "below" of the illustrated arrangement, e.g., so the magnetic fields of the first and fourth magnets 1002, 1008 are aligned with corresponding magnets above or below those magnets. Further, in the illustrated example, the strength of the first and fourth magnets 1002, 1008 (individually) is stronger than a strength of the second, third and fifth magnets 1004, 1006, 1010, although other implementations are also contemplated.

Further, the example 900 of FIG. 9, using similar sizes of magnets, may have increased magnetic coupling as opposed to the example 1000 of FIG. 10. For instance, the example 900 of FIG. 9 uses three magnets (e.g. the first, fourth, and fifth magnets 902, 908, 910) to primarily provide the magnetic coupling, with two magnets used to "steer" the magnetic fields of those magnets, e.g., the second and third magnets 904, 906. However, the example 1000 of FIG. 10 uses two magnets (e.g., the first and fourth magnets 1002, 1008) to primarily provide the magnetic coupling, with three magnets used to "steer" the magnetic fields of those magnets, e.g., the second, third, and fifth magnets 1004, 1006, 1008.

Accordingly, though, the example 1000 of FIG. 10, using similar sizes of magnets, may have increased magnetic alignment capabilities as opposed to the example 900 of FIG. 9. For instance, the example 1000 of FIG. 10 uses three magnets (e.g. the second, third, and fifth magnets 1004, 1006, 1010) to "steer" the magnetic fields of the first and fourth magnets 1002, 1008, which are used to provide primary magnetic coupling. Therefore, the alignment of the fields of the magnets in the example 1000 of FIG. 10 may be closer than the alignment of the example 900 of FIG. 9.

Regardless of the technique employed, it should be readily apparent that the "steering" or "aiming" of the magnetic fields described may be used to increase an effective range of the magnets, e.g., in comparison with the use of the magnets having similar strengths by themselves in a conventional aligned state. In one or more implementations, this causes an increase from a few millimeters using an amount of magnetic material to a few centimeters using the same amount of magnetic material.

Figure 11:
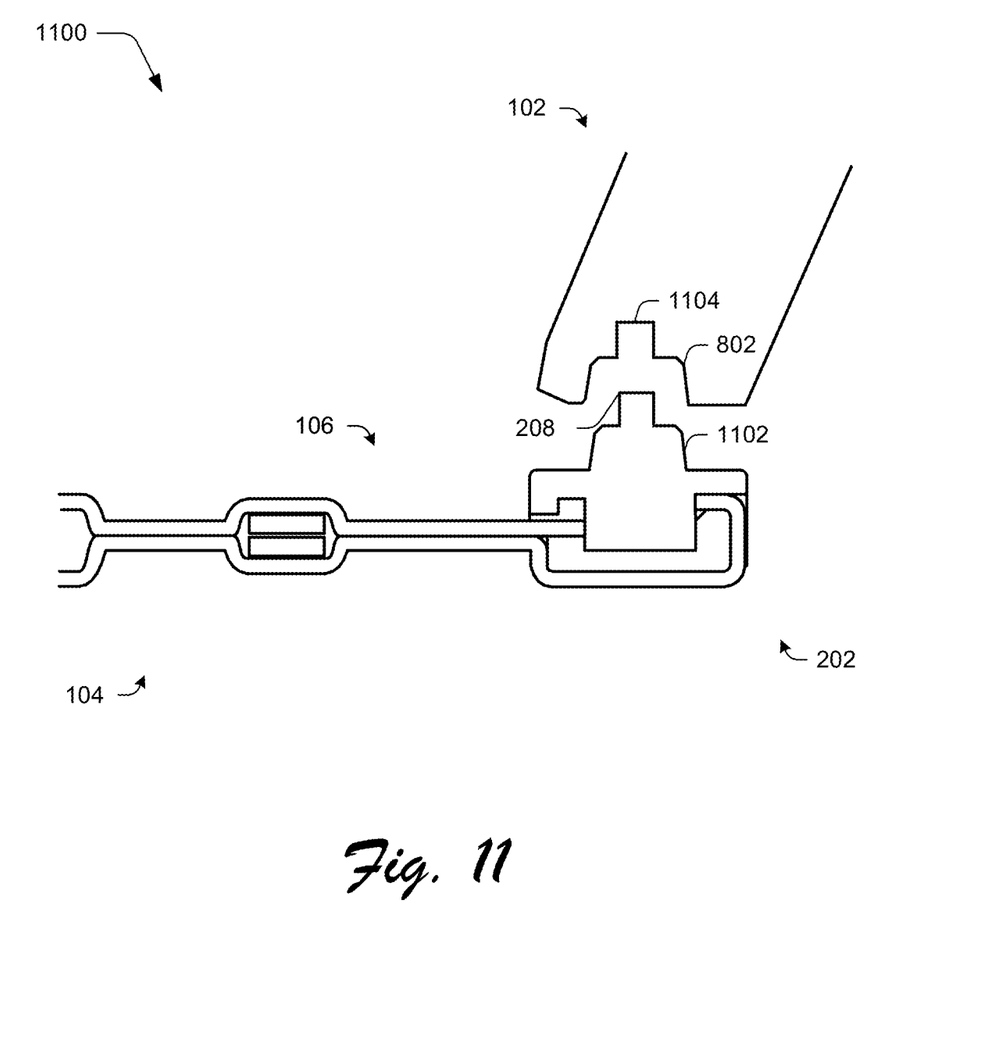
FIG. 11 depicts a cross section taken along an axis of FIG. 2 showing the mechanical coupling protrusion as well as a cross section of a cavity of the computing device in greater detail.

FIG. 11 depicts a cross section taken along an axis 1100 of FIG. 2 showing the mechanical coupling protrusion 208 as well as a cross section of the cavity 802 of the computing device 102 in greater detail. A projection 1102 of the connection portion 202 and channel 802 are configured to have complementary sizes and shapes to limit movement of the connection portion 202 with respect to the computing device 102. The protrusions 208, 210 may be formed from a variety of different materials, such as a glass-filled resin. Additionally, the protrusions 208, 210 may be pressed into and glued to a spine of the connection portion 202 and may also act to retain an outer layer fabric of the protection device that wraps around the spine and may do so as part of manufacture to hold this fabric in place by using holes in the fabric through which the protrusions 208 are inserted.

In this example, the projection 1102 of the connection portion 202 also includes disposed thereon the mechanical coupling protrusion 208 that is configured to be received in a complementary cavity 1104 disposed within the channel 802. The cavity 1104, for instance, may be configured to receive the protrusion 208 when configured as a substantially oval post having angled sides as shown in FIGS. 3-5, although other examples are also contemplated.

When a force is applied that coincides with a longitudinal axis that follows the height of the mechanical coupling protrusion 208 and the depth of the cavity 1104, a user overcomes the magnetic coupling force applied by the magnets solely to separate the protection device 104 from the computing device 102. However, when a force is applied along another axis (i.e., at other angles) the mechanical coupling protrusion 208 is configured to mechanically bind within the cavity 1104. This creates a mechanical force to resist removal of the protection device 104 from the computing device 102 in addition to the magnetic force of the magnetic coupling devices 204, 206.

In this way, the mechanical coupling protrusion 208 may bias the removal of the protection device 104 from the computing device 102 to mimic tearing a page from a book and restrict other attempts to separate the devices. Referring again to FIG. 1, a user may grasp the protection device 104 with one hand and the computing device 102 with another and pull the devices generally away from each other while in this relatively "flat" orientation, e.g., to mimic ripping a page from a book. Through bending of the rotatable hinge 106 the protrusion 208 and an axis of the cavity 1104 may be generally aligned to permit removal.

However, at other orientations, sides of the protrusion 208 may bind against sides of the cavity 1104, thereby restricting removal and promoting a secure connection between the devices. The protrusion 208 and cavity 1104 may be oriented in relation to each other in a variety of other ways as described to promote removal along a desired axis and promote a secure connection along other axes without departing from the spirit and scope thereof.

Example System and Device

Figure 12:
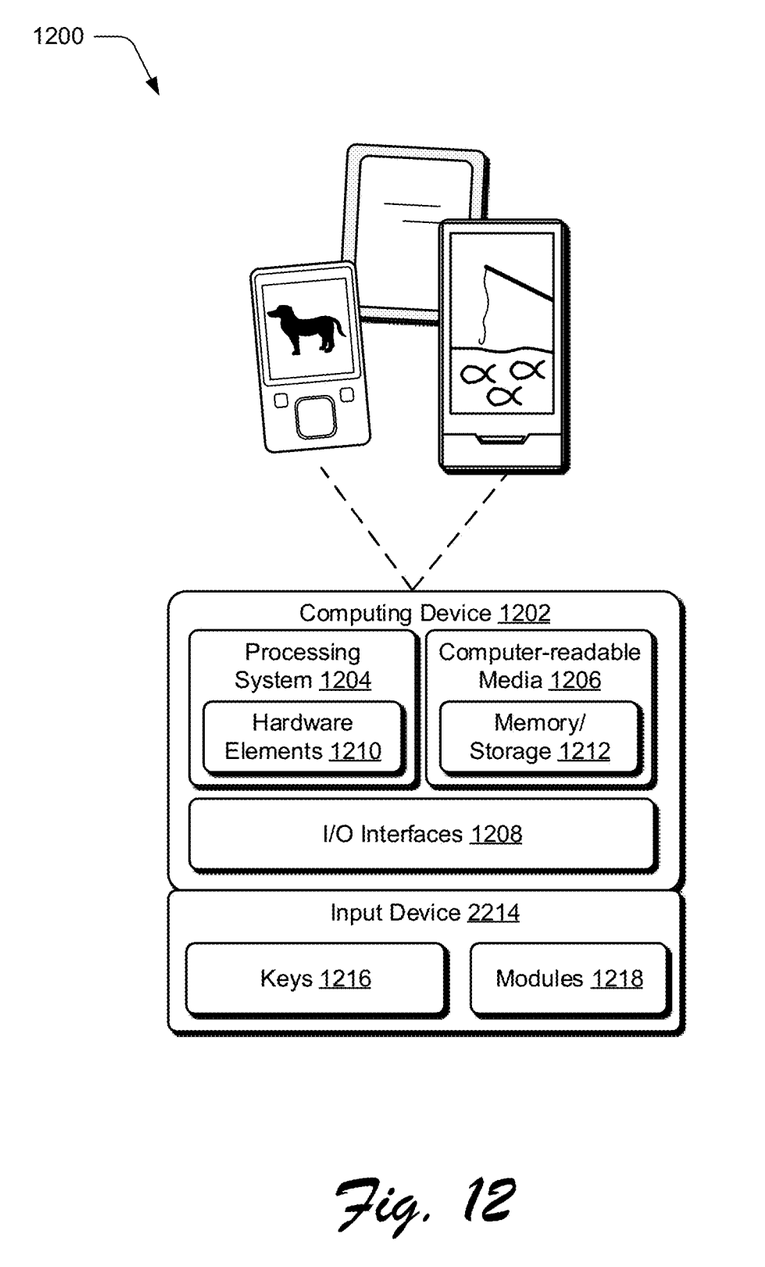
FIG. 12 illustrates an example system including various components of an example device that can be implemented as any type of computing device as described with reference to FIGS. 1-11 to implement embodiments of the techniques described herein.

FIG. 12 illustrates an example system generally at 1200 that includes an example computing device 1202 that is representative of one or more computing systems and/or devices that may implement the various techniques described herein. The computing device 1202 may be, for example, be configured to assume a mobile configuration through use of a housing formed and size to be grasped and carried by one or more hands of a user, illustrated examples of which include a mobile phone, mobile game and music device, and tablet computer although other examples are also contemplated.

The example computing device 1202 as illustrated includes a processing system 1204, one or more computer-readable media 1206, and one or more I/O interface 1208 that are communicatively coupled, one to another. Although not shown, the computing device 1202 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware element 1210 that may be configured as processors, functional blocks, and so forth. This may include implementation in hardware as an application specific integrated circuit or other logic device formed using one or more semiconductors. The hardware elements 1210 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1206 is illustrated as including memory/storage 1212. The memory/storage 1212 represents memory/storage capacity associated with one or more computer-readable media. The memory/storage component 1212 may include volatile media (such as random access memory (RAM)) and/or nonvolatile media (such as read only memory (ROM), Flash memory, optical disks, magnetic disks, and so forth). The memory/storage component 1212 may include fixed media (e.g., RAM, ROM, a fixed hard drive, and so on) as well as removable media (e.g., Flash memory, a removable hard drive, an optical disc, and so forth). The computer-readable media 1206 may be configured in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 may be configured in a variety of ways to support user interaction.

The computing device 1202 is further illustrated as being communicatively and physically coupled to an input device 1214 that is physically and communicatively removable from the computing device 1202. In this way, a variety of different input devices may be coupled to the computing device 1202 having a wide variety of configurations to support a wide variety of functionality. In this example, the input device 1214 includes one or more keys 1216, which may be configured as pressure sensitive keys, mechanically switched keys, and so forth.

The input device 1214 is further illustrated as include one or more modules 1218 that may be configured to support a variety of functionality. The one or more modules 1218, for instance, may be configured to process analog and/or digital signals received from the keys 1216 to determine whether a keystroke was intended, determine whether an input is indicative of resting pressure, support authentication of the input device 1214 for operation with the computing device 1202, and so on.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1202. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1202, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1210. The computing device 1202 may be configured to implement particular instructions and/or functions corresponding to the software and/or hardware modules. Accordingly, implementation of a module that is executable by the computing device 1202 as software may be achieved at least partially in hardware, e.g., through use of computer-readable storage media and/or hardware elements 1210 of the processing system 1204. The instructions and/or functions may be executable/operable by one or more articles of manufacture (for example, one or more computing devices 1202 and/or processing systems 1204) to implement techniques, modules, and examples described herein.

Conclusion

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. An apparatus comprising:
   a cover portion configured to cover at least a portion of a display device of a computing device having a mobile form factor such that the computing device is configured to be held by one or more hands of a user;
   a first mid-spine that is rotationally connected to the cover portion;
   a second mid-spine that is rotationally connected to the first mid-spine; and
   a connection portion that is rotationally connected to the second mid-spine, the connection portion configured to form a removable physical coupling to the computing device using:
   a projection that is configured to be disposed within a channel formed in a housing of the computing device; and
   a protrusion disposed on the projection, the protrusion configured to be received within a cavity formed as part of the channel.

2. An apparatus device as described in claim 1, wherein:
   the first mid-spine is rotationally connected to the cover portion and the second mid-spine using flexible hinges: or
   the second mid-spine is rotationally connected to the second mid-spine and the connection portion using flexible hinges.

3. An apparatus as described in claim 1, wherein the protrusion is configured to be removed from the cavity along an axis defined by a height of the protrusion from the projection and to resist movement along at least one different axis.

4. An apparatus as described in claim 3, wherein the protrusion is configured to mechanically bind within the cavity in order to resist the movement along the at least one different axis.

5. An apparatus as described in claim 3, wherein the height of the protrusion is between 1.9 and 3.0 millimeters.

6. An apparatus as described in claim 5, wherein the height is approximately 2.2 millimeters.

7. An apparatus as described in claim 3, wherein the protrusion and the projection each include top surfaces defined along respective axes that are normal to the axis defined by the height of the protrusion from the projection and sides that follow the axis, approximately, that is defined by the height.

8. An apparatus as described in claim 7, wherein the sides have a chamfer disposed proximal to a top side having an angle that is greater than an angle of other portions of the sides of the protrusion.

9. An apparatus as described in claim 7, wherein the sides have a first portion having an angle of approximately 1.5 degrees from the axis defined by the height.

10. An apparatus as described in claim 9, wherein the first portion is disposed on the side between the protrusion and the cover portion.

11. An apparatus as described in claim 7, wherein the sides have a second portion having an angle of approximately 63.5 degrees from the axis defined by the height.

12. An apparatus as described in claim 11, wherein the second portion follows a longitudinal axis of the connection portion.

13. An apparatus as described in claim 1, wherein the connection portion is further configured to form the removable physical coupling to the computing device through use of magnetism.

14. An apparatus as described in claim 13, wherein the magnetism is supported through use of a magnetic coupling device that is disposed on the connection portion or the computing device.

15. An apparatus as described in claim 1, wherein the protrusion is formed using a glass-filled resin.

16. An apparatus comprising:
    a cover portion configured to cover at least a portion of a display device of a computing device having a mobile form factor such that the computing device is configured to be held by one or more hands of a user; and
    a first mid-spine that is rotationally connected to the cover portion;
    a second mid-spine that is rotationally connected to the first mid-spine;
    a connection portion that is rotationally connected to the second mid-spine of the cover portion, the connection portion configured to form a removable physical coupling to the computing device using:

a projection that is configured to be disposed within a channel formed in a housing of the computing device; and a protrusion disposed on the projection, the protrusion configured to be received within a cavity formed as part of the channel, the protrusion is configured to be removed from the cavity along an axis defined by a height of the protrusion from the projection and to resist movement along at least one different axis, the protrusion having sides along the axis having:

a first portion disposed on the side between the protrusion and the cover portion; and a second portion that follows a longitudinal axis of the connection portion, the second portion having an angle in relation to the axis that is greater than an angle of the first portion in relation to the axis.

17. An apparatus as described in claim 16, wherein the connection portion is further configured to form the removable physical coupling to the computing device through use of magnetism.

18. A computing system comprising:

a computing device and an input device that are configured to be physically coupled using:

a projection that is configured to be disposed within a channel; and a protrusion disposed on the projection, the protrusion configured to be received within a cavity formed as part of the channel, the protrusion is configured to be removed from the cavity along an axis defined by a height of the protrusion from the projection and to resist movement along at least one different axis, the protrusion having sides along the axis having:

a first portion disposed on the side between the protrusion and an input portion; and a second portion that follows a longitudinal axis of a connection portion of the input device, the second portion having an angle in relation to the axis that is greater than an angle of the first portion in relation to the axis;

the input device comprising a first mid-spine that is rotationally connected to the input device, and a second mid-spine that is rotationally connected to the first mid-spine, the connection portion rotationally connected to the second mid-spine of the input device.

19. A computing system as described in claim 18, wherein the projection is included as part of the connection portion that is further configured to enable the computing device and the input device to be physically coupled through use of magnetism.

20. A computing system as described in claim 19, wherein the magnetism is supported through use of a magnetic coupling device that is disposed on the connection portion or the computing device.

* * * * *